United States Patent

Harbottle et al.

Patent Number: 5,662,445
Date of Patent: Sep. 2, 1997

[54] LOCKING NUT

[75] Inventors: William E. Harbottle, North Canton; Mark A. Joki, Dover, both of Ohio

[73] Assignee: The Timken Company, Canton, Ohio

[21] Appl. No.: 611,721

[22] Filed: Mar. 6, 1996

[51] Int. Cl.$^6$ .................................................. F16B 29/00
[52] U.S. Cl. ........................ 411/433; 411/291; 411/290; 411/288
[58] Field of Search ............................ 411/433, 291, 411/290, 288

[56] References Cited

U.S. PATENT DOCUMENTS

| 171,898 | 1/1876 | Wiles | 411/291 |
|---|---|---|---|
| 609,144 | 8/1898 | Goddin | 411/291 |
| 2,391,712 | 12/1945 | King et al. | 411/291 |
| 2,421,254 | 8/1947 | Froelich | 411/291 |
| 4,557,652 | 12/1985 | Lungren | 411/433 |

FOREIGN PATENT DOCUMENTS

| 738374 | 10/1955 | United Kingdom | 411/291 |
|---|---|---|---|

*Primary Examiner*—Rodney M. Lindsey
*Assistant Examiner*—Fredrick Conley
*Attorney, Agent, or Firm*—Polster, Lieder, Woodruff & Lucchesi, L.C.

[57] ABSTRACT

A compact locking nut has a body provided with a threaded bore along which the nut engages a thread so that upon rotation it will advance over a thread to a position suitable for securing and positioning a machine component such as a bearing. The nut has a machined back face along which it bears against the secured machine component and a front face at its other end. The body contains two grooves—one external in that it opens outwardly from the exterior surface and the other internal in that it opens into the bore—and these grooves divide the body into a clamping section, a locking section, and an intervening web which is thin enough to flex with relative ease. The external groove lies closest to the back face, whereas the internal groove lies closest to the front face. On its exterior the body has lands which extend out to the front face. Typically, the body derives from a forging having the lands and a bore. The threads, the two grooves, and the back face are all machined while the body is gripped along its lands in a chuck with the front face in the chuck. In other words, essentially all of the machining is performed in a single setup. Machine screws pass through the locking section and web and thread into the clamping section, and when turned down drive the locking section over the clamping section to jam the threads of the nut on the thread engaged by the nut. The nut may as be provided in an inside-out variation.

19 Claims, 4 Drawing Sheets

1

LOCKING NUT

BACKGROUND OF THE INVENTION

This invention relates in general to a nut for securing a machine component and more particularly to a locking nut which may be secured against rotation while maintaining considerable precision in its axial position and to a method of manufacturing the nut.

Locking nuts exist in a variety of configurations for securing machine components on spindles and shafts or in housings. One of the more important uses of locking nuts resides in holding bearings on spindles, particularly on spindles at ends of drive and steer axles for large trucks. The typical spindle on one of these axles projects through the hub to which a road wheel is secured. Two single row tapered roller bearings, which are mounted in opposition, are interposed between the spindle and hub to enable the hub to rotate with minimum friction on the spindle. The inner races or cones of the bearings fit around the spindle, while the outer races or cups fit into the hub. The spindle at its end has a thread over which a nut passes, and the position to which the nut is advanced determines the setting for the bearings. Most automotive bearings are set near a condition known as zero end play, whether it be with a very slight amount of end play or a very slight amount of preload, the latter being preferred. Too much end play detracts from stability, and the hub and the wheel may wobble, producing excessive seal wear. Moreover, excessive end play causes the load zone in each of the bearings to concentrate at a few rollers, and this may shorten the life of the bearings. Excessive preload, on the other hand, imparts more force to the bearings and may cause the bearings to fail early.

A variety of nuts exist for holding bearings in place on spindles, one of the most common being jam nuts. Basically two nuts thread over the spindle. The one comes against the bearing, whereas the other is turned down against the first or in effect is jammed against the first. The first nut brings the bearings to a desired setting, and when that setting is achieved that nut lies against the inboard flanks of the thread on the spindle, that is to say against the flanks which are presented toward the bearing. But when the second nut is turned down tightly against the first nut, the second nut drives the first nut slightly farther along the spindle—far enough to bring the thread of the first nut against the outboard flanks of the thread on the spindle. This changes the setting of the bearings and to compensate for this change is difficult indeed, since threads are not machined to close tolerances. Thus, the distance the first nut advances when the second nut is turned down against it cannot be predicted with any certainty, and this confines the use of jam nuts to the region of end play which can be measured with dial indicators. To go into preload with jam nuts creates the danger of overloading the bearings.

Unitary locking nuts exist, and some of these do not change the setting of the bearings. But most unitary nuts require substantial machine work and are expensive to manufacture. Moreover, they require quite a few thread convolutions, and as a consequence are too long for some applications where compactness is important.

For example, one unitary nut, which is sold under the trademark SPIETH and bears the model designations MSR, MSA and MSW, is machined from a single forging or from tube or bar stock to provide the nut with a thread and a configuration that enables it to lock up on a threaded spindle. But the machining requires the workpiece to be gripped twice in a chuck for turning, once from each end. This, in turn, increases the time and the machine tools required to produce the nut, and as a consequence the nut is quite expensive. Indeed, its expense has restricted its use primarily to precision machinery, such as machine tools. Moreover, it is quite long and thus requires a substantial length of shaft thread—more than exists at the ends of many truck spindles. One rarely finds this nut in automotive applications.

The present invention resides in a unitary locking nut which assumes a predictable position on a thread as it is secured against rotation. All of the turning operations on the workpiece from which the nut derives are performed while the nut is gripped at a single location by a chuck. The nut is quite compact, and thus occupies relatively few thread convolutions.

The invention also consists in the parts and in the arrangements and combinations of parts hereinafter described and claimed.

DESCRIPTION OF THE DRAWINGS

In the accompanying drawings, which form part of the specification and wherein like numerals and letters refer to like parts wherever they occur

DETAILED DESCRIPTION OF THE INVENTION

Figure 1:
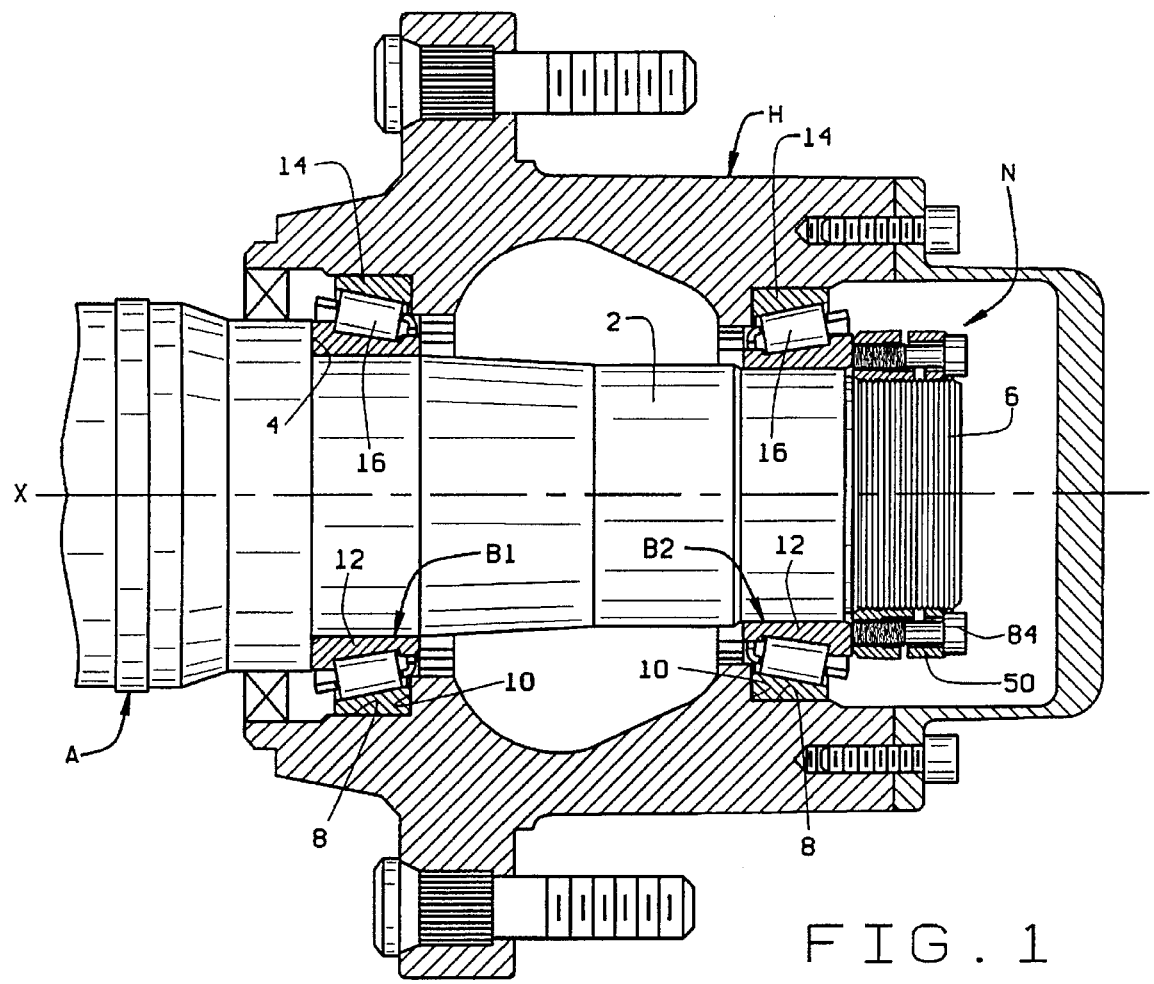
FIG. 1 is a longitudinal sectional view of a spindle and hub and tapered roller bearings located between the two, with the bearings being held in place and set with a locking nut constructed in accordance with and embodying the present invention.

Referring now to the drawings (FIG. 1), a locking nut N threads over the end of an axle A and holds bearings B1 and B2 in place on the axle A. The bearings B1 and B2, which are mounted in opposition, in turn support a hub H, enabling the hub H to rotate relative to the axle A about an axis X, but not shift axially along the axle A. Moreover, the nut N—or more accurately the axial position it assumes—determines the setting for the two bearings B1 and B2, and that may be one of end play or preload. The nut N is highly compact and essentially unitary in construction.

The axle A at its end has a spindle 2 and slightly further inwardly a shoulder 4 from which the spindle 2 projects (FIG. 1). The very end of the spindle 2 is provided with an external thread 6 which is engaged by the nut N. The hub H fits around the spindle 2 of the axle A and contains bores 8, which open out of its ends, and shoulders 10 at the inner ends of the bores 8. Each of the bearings B1 and B2 possesses a single row of rolling elements and raceways which are inclined or oblique with respect to the axis X. As a consequence, each bearing B1 and B2 will transmit radial loads between the axle A and hub H as well as an axial load in one direction. Since the bearings B1 and B2 are mounted in opposition, the hub H is confined both radially and axially on the axle A, but of course is free to rotate about the axis X.

Preferably, each bearing B1 and B2 is a single row tapered roller bearing. As such, each includes an inner race or cone 12, and outer race or cup 14 which encircles the cone 12, and rolling elements in the form of tapered rollers 16 arranged in a single row between the cone 12 and cup 14 (FIG. 1). Actually, the rollers 16 contact the cone 12 and cup 14 along tapered raceways on those races, with the geometry being such that the envelopes in which the raceways and the tapered side faces of the rollers 16 lie form cones having their apexes generally at a common point along the axis X. The cone 12 and cup 14 of each bearing B1 and B2 has a back face which is squared off with respect to the axis X, and through these back faces thrust loads are transferred through the bearings B1 and B2. The cone 12 of the inboard bearing B1 fits around the spindle 2 with its back face against the shoulder 4. The cup 12 of the inboard bearing B1 fits into the inboard bore 8 of the hub H with its back face against the shoulder 10 at the end of that bore 8. The cup 14 of the outboard bearing B2 fits into the outboard bore 8 of the hub H with its back face against the shoulder 10 at the end of that bore 8. The cone 12 of the outboard bearing B2 encircles the spindle 2 adjacent to the thread 6 with its back face presented away from the shoulder 4 and generally toward the thread 6. The whole arrangement is maintained in place by the nut N which is engaged with and advanced over the thread 6 to in effect form a shoulder or stop at the back face of the cone 12 for the outboard bearing B2.

Of course, the position to which the nut N is advanced over the external thread 6 determines the setting for the bearings B1 and B2. It may be advanced to a position in which the bearings B1 and B2 are actually loaded, even in the absence of a working load, this being known as preload. On the other hand, the nut N may be advanced to a position in which radial and axial clearances exist in the bearings B1 and B2, this being known as end play. Once the nut N is advanced to the desired position, whether it places the bearings B1 and B2 in preload or leaves end play, the nut N itself is deformed so that it becomes jammed on the thread 6 and is extremely difficult to rotate. In effect, the deformation locks the nut N on the spindle 2. But the deformation does not change the axial position of that end of the nut N that is presented toward the back face of the outboard bearing B2. As a consequence the nut N enables the bearings B1 and B2 to be set with considerable precision, even in preload.

Figure 2:
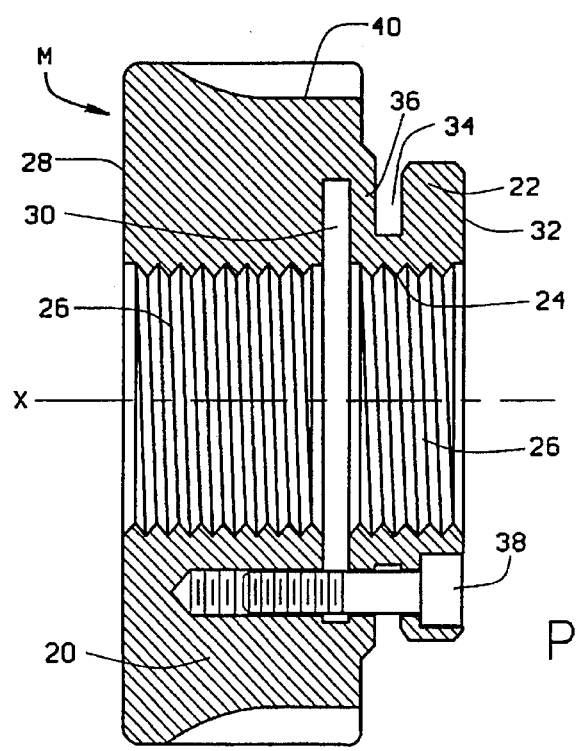
FIG. 2 is a sectional view of a locking nut forming part of the prior art.

The locking nut N, upon initial observation does not appear too different from a conventional locking nut M (FIG. 2) of the type sold under the trademark SPIETH, but differences exist and they are significant. The conventional nut M is preferably formed from a steel forging, and although it is essentially unitary, it has two major sections—a clamping section 20 and a locking section 22, both of which surround a bore 24 containing a common thread 26. The clamping section 20 extends out to a back face 28 against which the part to be positioned is located—in the case of axle A and hub H, the cone 12 of the outboard bearing B2. The opposite end of the clamping section 20 lies along a radial groove 30 that opens inwardly into the bore 24. The locking section 22 extends between a front face 32 and another radial groove 34 which opens outwardly. The two grooves 30 and 34 lie quite close together, and are separated by a thin web 36 which, outwardly beyond the internal groove 30, is connected to the clamping section 20 and inwardly beyond the external groove 34 is connected to the locking section 22. The web 36 is thin enough to flex and as a consequence the locking section 22 when subjected to an axial force will move toward the clamping section 20.

That force is derived from several machine screws 38 which pass through the locking section 22 and web 36 and thread into the clamping section 20. As the nut N deforms under the force exerted by the screws 38, the thread 26 in the locking section 22 moves toward the thread 26 in the clamping section 20. If the nut M were on the spindle 2, the thread 26 of the locking section 22 would move from the inboard flanks of the thread 6 on the spindle 2 to the outboard flanks to effectively secure the nut M against rotation on the axle A. In short, the thread 26 of the nut N would become jammed on the thread 6 of the spindle 2.

The clamping section 20 is larger than the locking section 22, both in length and diameter. Along the exterior of the clamping section 20, the nut M has lands 40 which enable the nut M to be gripped with a wrench and turned.

The conventional nut M typically begins as an annular forging, which, although possessing the general configuration for the nut M including the lands 40, must be machined to impart the configuration that enables the nut M to lock up over an external thread, such as the thread 6 on the spindle 2. First, the forging is secured in the chuck of a machine tool with its clamping section 20 in the chuck. However, the lands 40 for the most part are exposed. As the chuck rotates, a cutting tool takes off the points where the lands 40 meet, thus producing a reference surface having its center at the axis of rotation X. Another cutting tool cuts the external groove 34 in the locking section 22, while still another faces the exposed end of the locking section.

Upon completion of these machining operations, the forging is removed from the chuck and reversed so that the locking section 22 lies within the chuck, and the chuck grips the forging along the machined reference surface provided by removing the points where the lands 40 meet. With the forging again rotating, a bore 24 is machined into the forging along the axis of rotation, the internal groove 30 is cut, the thread 26 is cut, and the back face 28 is machined perpendicular to the axis X. This completes the machining operations which convert the forging into the conventional nut M, save for drilling and tapping the holes which receive the machine screws 38. Actually, the machining sequence may be reversed, but even so, the forging must be fitted to a chuck on two occasions. Also, the nut M may derive from bar stock or tube stock, not necessarily a forging.

Since the machining that produces the conventional nut M requires cuts from both ends of a workpiece and consequent gripping in a chuck at both ends, the machining represents a significant cost in the manufacture of the conventional nut M. Indeed, the cost restricts the use of the nut M to those applications which can justify it—applications such as precision machinery. In contrast, the annular forging from which the nut N derives is gripped in a machine tool chuck only once, and all outs and the boring are performed from one end of the forging.

Figure 3:
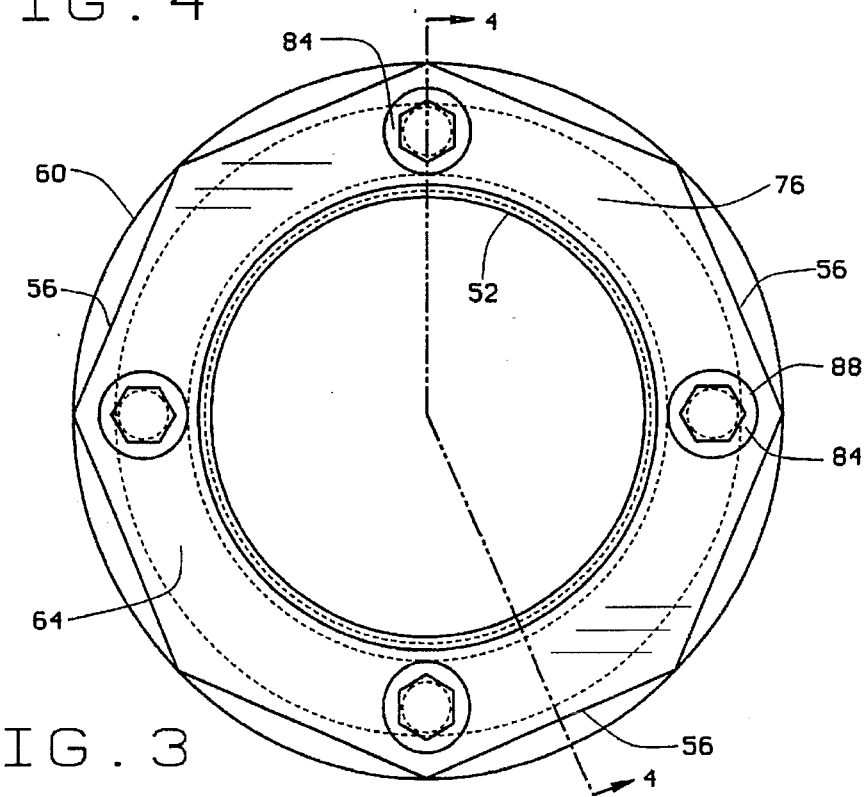
FIG. 3 is an end view showing the front face of the locking nut of the invention.

The nut N includes (FIGS. 3–5) a main body 50 which initially exists as a single or unitary workpiece, typically a forging, but also perhaps a piece of bar stock or tube stock. The nut N has a center axis X along which a through bore 52 extends, and the surface of the bore 52 is for the most part occupied by a thread 54 which forms an internal axially directed surface on the body 50. Externally, the body 50 has lands 56 (FIG. 3) which impart an octagonal configuration to one end of the body 50. At its opposite end the body 50 has a beveled surface 58 (FIG. 4) that tapers downwardly toward the axis X. Between the lands 56 and the beveled surface 58 lies a cylindrical intervening surface 60. The beveled surface 58 and intervening surface 60 are machined, whereas the lands 56 are simply derived from the forging without further finishing. The lands 56, beveled surface 58 and intervening surface 60 form an external axially directed surface on the body 50. The lands 56 lead out to a front face 64 which is generally squared off with respect to the axis X and like the lands 58 is not machined, it being derived from the forging operation. The beveled surface 58 leads out to a back face 66 which is machined, preferably perpendicular to the axis X. The thread 55 does not run all the way out to the back face 66, but instead opens out of that face through an annular relief 68 that is perhaps 0.010 inches deep.

Figure 4:
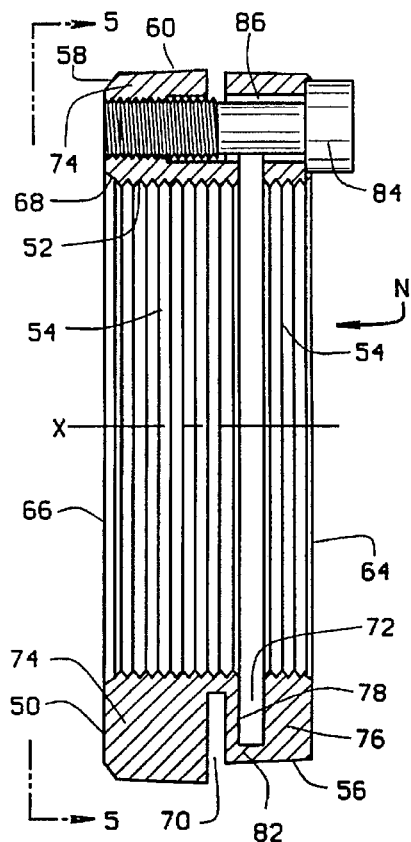
FIG. 4 is a sectional view of the locking nut taken along line 4—4 of FIG. 3.
Figure 5:
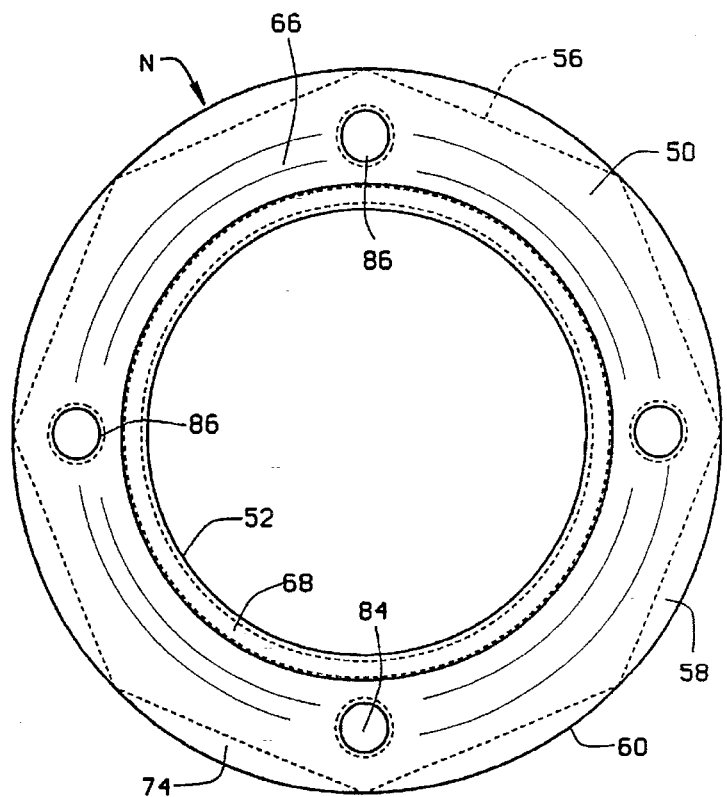
FIG. 5 is an end view showing the back face of the locking nut and taken along line 5—5 of FIG. 4.

The body 50 is interrupted by external and internal grooves 70 and 72 which are spaced axially and divide the body 50 into a clamping section 74, a locking section 76 and an intervening web 78 (FIG. 4). The external groove 70 opens outwardly through the external surface and separates the intervening surface 60 from the lands 56. It is between 0.060 and 0.125 inches wide, and preferably 0.095 inches. The internal groove 72 opens into the bore 52 through the thread 54. It is between 0.080 and 0.150 inches wide, and preferably 0.110 inches wide. The clamping section 74 lies between the external groove 54 and back face 66. Its length or axial dimension should be 10% to 25% of the diameter of the bore 52 and preferably 17%. The clamping section 74 is connected to the web 78 through an inner connecting segment 80. The locking section 76 lies between internal groove 72 and the front face 64 and is joined to the web 78 through an outer connecting segment 82 located at the lands 56.

The thread 54 extends through the clamping section 74, the inner connecting segment 80 and the locking section 76 without interruption in pitch, that is the pitch does not vary throughout the length of the thread 54. The internal groove 72 interrupts the thread 54, but even so the pitch of the thread 54 undergoes no change across the groove 72, at least while the web 78 remains undistorted. In other words, no variation or interruption in the pitch of the thread 54 exists between the clamping section 74 and the locking section 76. The clamping section 74 together with the inner connecting segment should contain 7 to 12 and preferably 10 convolutions of the thread 54. The locking section 76 should contain between 2 and 6 and preferably 3 convolutions of the thread 54. In any event, the portion of the thread 54 that lies within the clamping section 74—and likewise within the inner connecting segment 80—should exceed the portion that is in the locking section 76 by at least 3 convolutions.

The web 78 is thin enough and long enough to flex and thereby allow the locking section 76 to move toward the clamping section 74. To this end, the axial dimension of the web 78 is between 0.040 and 0.100 inches and is preferably 0.060 inches. The radial dimension of the web 78, that is the distance between the bottoms of the two grooves 70 and 72, should be between 5% and 20% of the diameter of the bore 52 and preferably 10%. The flexure of the web 78, of course, disrupts the pitch between the segment of thread 54 in the clamping section 74 and the segment within the locking section 76.

Figure 6:
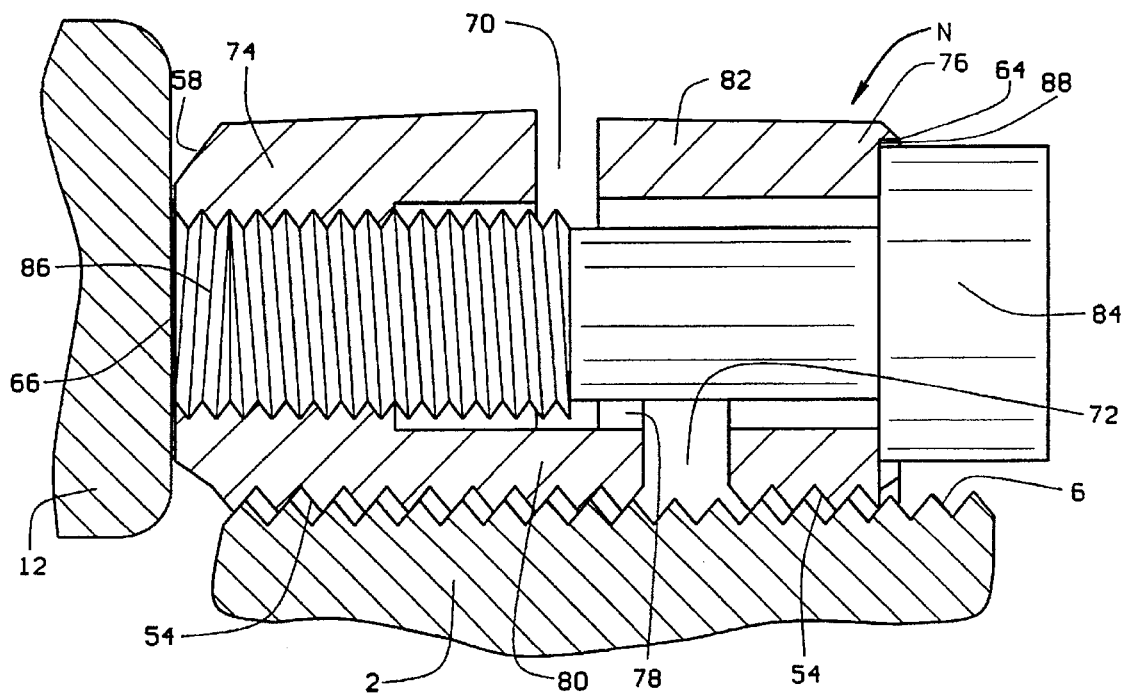
FIG. 6 is a fragmentary sectional view of the locking nut on the spindle before it is distorted.

To effect this flexure, the nut N has machine screws 84 which pass through the locking section 76 and web 78, and thread into the clamping section 74, so that when they are turned down against the locking section 76, they move the locking section 76 toward the clamping section 74 (FIGS. 4 and 6). The body 50 contains several axially directed holes 86 which lie parallel to the axis X and are arranged at equal circumferential intervals around the main bore 52. The holes 86 are threaded within a portion of the clamping section 74, with the threads being configured to be engaged by the threads on the machine screws 84. Within the locking section 76, web 78, and partially into the clamping section 74 the holes 86 are counterbored to loosely receive the machine screws 84. Thus, the screws 84 only engage the clamping section 74 in the portion of that section that lies closest to the back face 66. The heads of the machine screws 84 fit into shallow sockets 88 where they bear against the end of the body 50. Thus, the heads of the screws 84 are accessible at one end of the nut N where they may be engaged with a wrench and turned.

When the screws 84 are turned so as to advance into the holes 86, their heads bear against the locking section 76. Further advancement of the screws 84 drives the locking section 76 toward the clamping section 74. The web 78 flexes to accommodate the displacement, but the flexure should not exceed the elastic limit of the metal in the web 78. Thus, when the screws 84 are backed off, the locking section 76 returns to its normal position.

The nut N retains the bearings B1 and B2 on the spindle 2, and the bearings B1 and B2 confine the hub H axially, yet enable it to rotate with minimal friction (FIG. 1). Once the hub H and the bearings B1 and B2 are installed over the spindle 2, the nut N is threaded over the spindle 2 with the back face 66 of its body 50 presented toward the cone 12 of the outboard bearing B2. Actually, the thread 54 of the nut N engages the thread 6 of the spindle 2, and the nut N advances easily over the spindle 2. Since the segment of the thread 54 in the locking section 76 represents a continuation of the thread 54 in the clamping section 74 without any variation in pitch, the locking section 76 passes onto the spindle 2 without any resistance, and the nut N continues to advance until the back face 66 of its body 50 comes against the back face of the cone 12 for the outboard bearing B2. The final increment of rotation should be such that the nut N brings the two bearings B1 and B2 to the proper setting. After the final increment of rotation, which is usually ascertained by measuring the torque applied to the nut N, the thread 54 in the body 50 of the nut N bears against the inboard flanks of the thread 6 on the spindle 2, that is against the flanks which are presented toward the bearing B2 (FIG. 6). This holds true for the entire thread 54, that is the segment in the clamping section 74 and the segment in the locking section 76 as well. Being compact, the nut N requires relatively few thread convolutions on the spindle 2.

Figure 7:
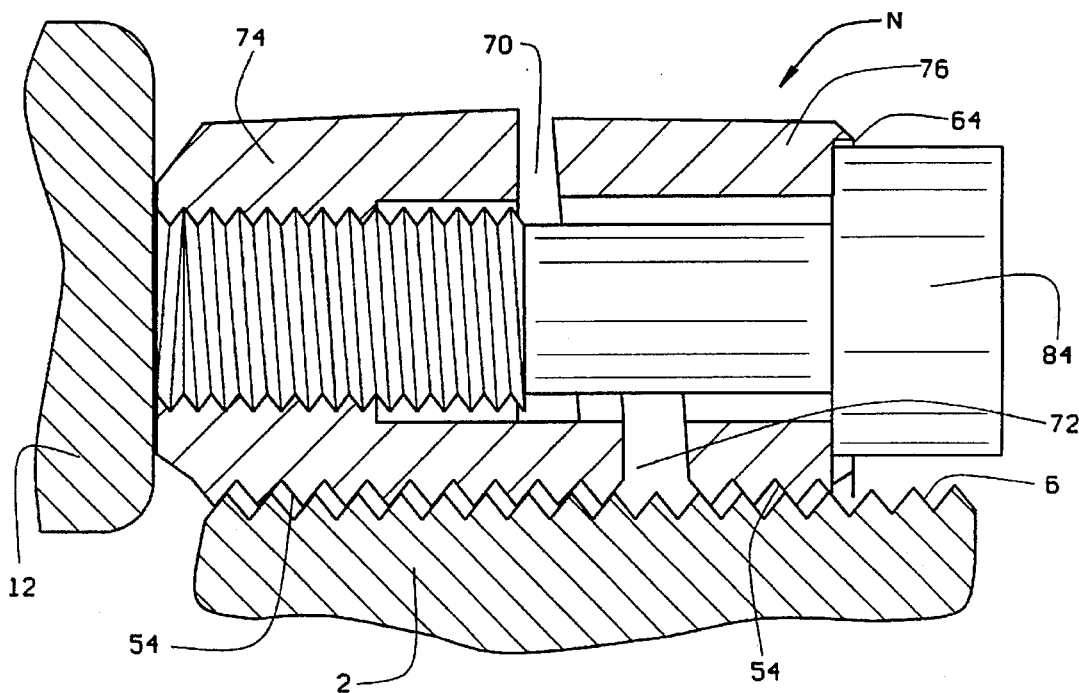
FIG. 7 is a fragmentary view of the locking nut on the spindle and distorted to secure it firmly on the spindle.

Once the nut N reaches the proper position on the thread 6 of the spindle 2, the machine screws 84 are turned down against the ends of their sockets in the locking section 76. The force exerted by the screws 84 drives the smaller locking section 76 toward the larger clamping section 74, with the web 78 flexing to accommodate the displacement. Indeed, the locking section 76 advances until the segment of the thread 54 that lies within it bears against the outboard flanks of the thread 6 on the spindle 2 (FIG. 7). But the segment of thread 54 within the clamping section 20 remains against the inboard flanks of the thread 6. The nut N is in effect jammed on the thread 6 and will not rotate with respect to the spindle 2.

When the machine screws 84 are backed off, the web 78 recovers its elastic deformation, and the locking section 76 returns to its initial position with the segment of thread 54 within it coming against the inboard flanks of the thread 6 on the spindle 2. With the body 50 restored to its initial configuration, the nut N will rotate easily on the spindle 2.

The manufacture of the nut N begins with a rough workpiece, usually in the form of an annular forging, preferably of steel, having the general shape of the body 50. The forging includes the lands 56, the beveled surface 58 and the front face 64, as well as other surfaces corresponding to the back face 66, the intervening surface 60 and the surface of the bore 52. The forging is placed in the chuck of a machine tool with its front face 64 within the confines of the chuck and the face corresponding to the back face 66 exposed outside of the chuck. Indeed, the chuck grips the forging along the lands 56, thus effecting a grip which cannot slip. All machining operations required to convert the forging into the body 50 are performed while the forging remains gripped in the chuck along its lands 56, save for those which produce the holes 86 and sockets 88.

First, the bore 52 is machined through the entire length of the body 50, and it lies along the axis of rotation for the chuck which coincides with the axis X of the nut N. Next the internal groove 72 is cut followed by the thread 54. Since the thread 54 is cut in a single machining operation, it remains uniform throughout the bore 52 and no variation in pitch exists between the clamping section 74 and the locking section 76. Next the external groove 70 is cut and the beveled surface 58 and cylindrical intervening surface 60 is turned. Then the relief 68 is cut into the body 50 at the exposed end of the bore 52. Finally, the back face 66 is machined into the body 50 perpendicular to the axis X.

When the machined forging is removed from the chuck, the holes 86 are drilled, counterbored and tapped, and the sockets 88 are formed, thus completing the body 50. Then the machine screws 84 are threaded into the holes 86, but only until their heads bear lightly against the bottoms of the sockets 88.

Means other than the machine screws 84 may be used to drive the locking section 76 toward the clamping section 74. For example, external clamps may extend between the two sections, or a jack screw may be located behind the front face. Also, the body 50 may be formed from bar stock or tube stock and need not be a forging. Furthermore the external surface of the body 50 may be cylindrical throughout, that is, the lands 56 may be eliminated. In that case the body is provided with drive holes that open out of the front face 64 and enable the nut to be engaged with a spanner wrench.

Where the clamping section 74 of the body 50 is relatively short, it may tend to rock backwardly on the thread 6 of the spindle 2 when the machine screws 84 are tightened. As a consequence, the back face 66 tilts backwardly. To compensate for this change in inclination, the front face may be machined at a slight angle to the axis X, with its outer margin projecting axially beyond its inner margin, perhaps between 0.001 and 0.003 inches. The inclination should be such that when screws 84 are tightened and the clamping section 74 rocks backwardly, the back face 66 assumes a position perpendicular to the axis X. To be sure, this changes the axial location of the back face 66 along the spindle 2 and this in turn changes the setting of the bearings B1 and B2, but the change is predictable with considerable precision, and one can compensate for it when selecting the final increment for advance of the nut N. In most instances, the change in position is accounted for in the torque applied to the nut N in its final increment of advance.

Figure 8:
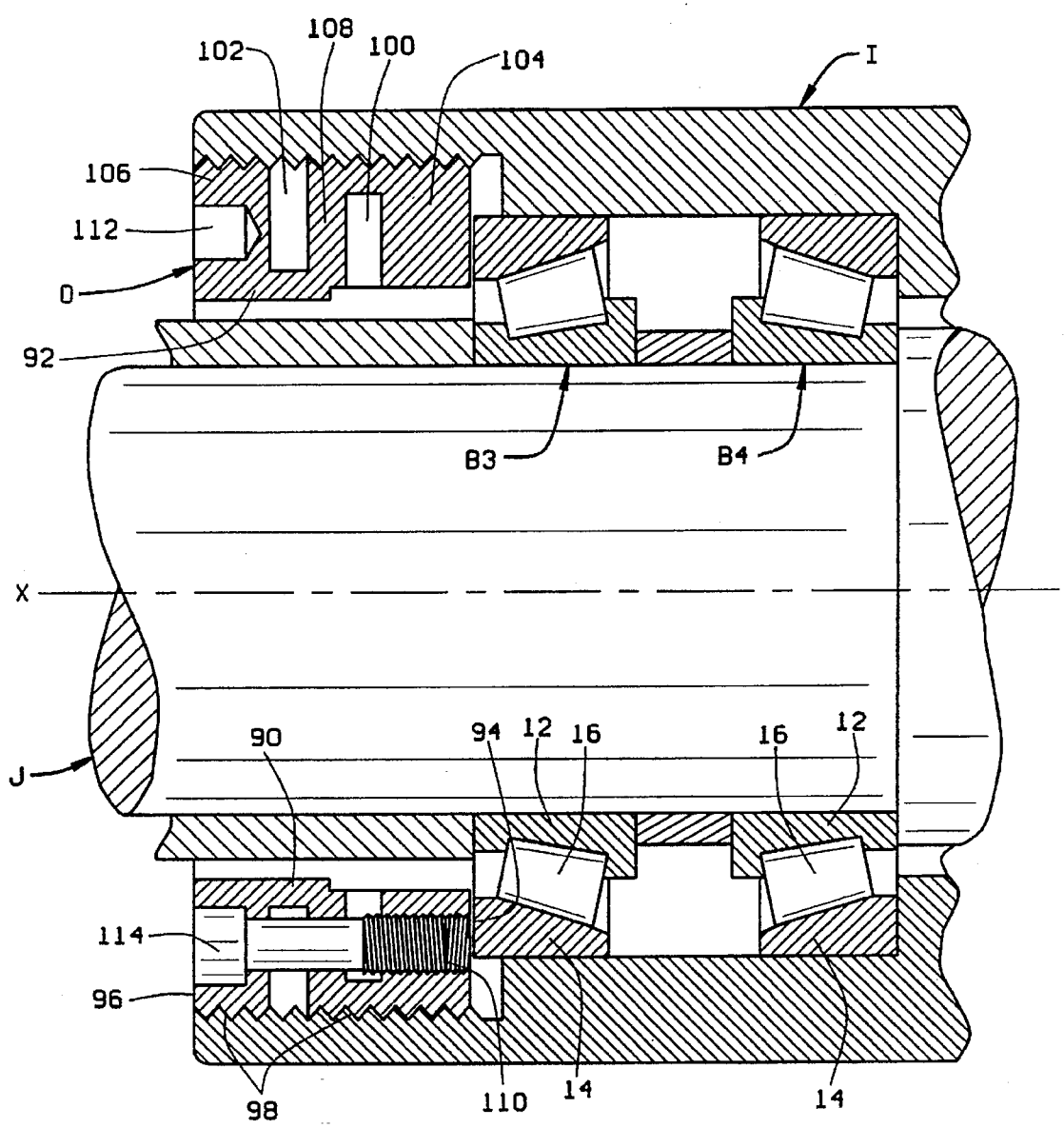
FIG. 8 is a sectional view of an inside-out variation of the nut installed in a housing and around a shaft.

A modified nut O (FIG. 8) represents an inversion or inside-out variation of the nut N and as such engages the interior surface of a housing I instead of the exterior surface of a shaft J. The nut O is threaded into the housing I where it may secure two directly mounted tapered roller bearings B3 and B4 which support the shaft J in the housing I. Actually, either the housing I or the shaft J may rotate.

The modified nut O has a body 90 which, like the body 50 of the nut N, is derived from a forging—indeed, an annular forging. As such the nut O has a through bore 92, the surface of which is rough in the sense that it is acquired in the forging operation and is not machined. The surface of the bore 92 encircles the axis X of the nut O and forms the internal axially directed surface of the body 90, its center being generally along the axis X. The bore 92 extends between a back face 94 and a front face 96, and is machined in the region of the back face 94. Both faces 94 and 96 are generally perpendicular to the axis X, but the back face 94 is machined, while the front face 96 is not. The nut O along the back face 94 of it body 90 abuts the cup 14 of the bearing B3, thus serving to position the bearing B3 in the housing I and establish the setting for the two bearings B3 and B4. On its external axially directed surface the nut O has a thread 98 of constant and uninterrupted pitch, that is the pitch remains the same throughout the full length of the thread 98.

The body 90 also contains an internal groove 100 and an external groove 102 which divide the body 90 into a clamping section 104, a locking section 106 and an intervening web 108. The clamping section 104 lies between the internal groove 100 and the back face 94. The locking section 106, on the other hand, lies between the front face 96 and the external groove 102. The web 108 is between the two grooves 100 and 102. The body 90 also has holes 110 which extend parallel to the axis X through the locking section 106 and web and into the clamping section 104 where they are tapped.

Finally, the body 90 in its locking section 106 has sockets 112 which open axially out of the front face 96. The sockets 112 are configured and spaced to receive a spanner wrench for turning the nut O.

The nut O also includes machine screws 114 which extend through the holes 110 and engage the threads in the clamping section 104. The screws 114 have heads which bear lightly against the locking section 106, at least initially.

The screws 114, when turned down against the locking section 106, drive the locking section 106 toward the clamping section 104. The web 108 accommodates this displacement by flexing. But the displacement disrupts the pitch in the thread 98, so that it no longer is uniform throughout. Instead, an interruption in pitch exists between the thread 98 in the clamping section 104 and the thread 98 in the locking section 106, and that interruption serves to jam the clamping section 104 and locking section 106 on the thread of the housing I.

To manufacture the inside-out nut O, a forging is produced in the shape of the body 90. This forging is then placed over a chuck which grips it along the surface of the through bore 92 in the region of the front face 96. Indeed, the chuck projects into the bore 92 at the front face 96. Since the internal groove 100 lies closer to the back face 94 than the front face 96, enough surface area exists in the bore 92 to effect a good grip with the internal chuck.

With the forging rotating on the chuck, the internal and external grooves 100 and 102 are machined into the forging, the former of course from within the through bore 92. Moreover, the bore 92 may be machined up to the internal groove 100. Since the chuck projects into the bore 92 at the front face 96, the bore 92 remains open at the back face 94, providing access for the tool that cuts the internal groove 100. The external groove 102 is cut from the exterior of the forging, and the back face is machined smooth and at the proper angle with respect to the axis X, likewise from the exterior of the forging. Finally, the exterior of the forging is turned down and the thread 98 is cut without any interruption or variation in pitch throughout its length, that is, over both the clamping section 104 and the locking section 106.

After the forging has undergone the foregoing machining, it is removed from the chuck and the holes 110 are drilled and tapped. The sockets 112 are likewise drilled.

This invention is intended to cover all changes and modifications of the example of the invention herein chosen for purposes of the disclosure which do not constitute departures from the spirit and scope of the invention.

What is claimed is:

1. A locking nut comprising: a body having first and second axially directed surfaces surrounding an axis, with one of the surfaces being presented inwardly toward the axis and forming a through bore in the body and the other being presented outwardly away from the axis, the body also having a back face extending generally between the first and second axially directed surfaces at one end of the body and a front face extending generally between the first and second axially directed surfaces at the other end of the body, the back face being machined to a prescribed angle with respect to the axis, the body further having a first groove that opens out of its first axially directed surface and a second groove that opens out of its second axially directed surface, with the grooves dividing the body into a clamping section that lies generally between the back face and the second groove, a locking section that lies between the front face and the first groove, and a web that lies generally between the grooves, the web having the capacity to flex so that the locking section may move axially toward the clamping section upon the application of sufficient force, the first axially directed surface having a thread along it on both sides of the first groove without any variation in the pitch of the thread across the first groove, there being a greater length of thread on the side at which the clamping section lies than on the side at which the locking section lies, the second axially directed surface providing a gripping area between the second groove and the front face; and screws which extend axially between and located within the locking section and the clamping section, driving the locking section toward the clamping section, whereby the web will flex to accommodate the displacement and the initial uniform pitch between the portion of the thread on the clamping section and the portion on the locking section will be disrupted.

2. A locking nut according to claim 1 wherein the machine screws thread into the clamping section and have heads which bear against the locking section when the screws are turned to advance into the clamping section.

3. A locking nut according to claim 1 wherein the body is derived from a forging and the gripping area along the second axially directed surface is not machined.

4. A locking nut according to claim 3 wherein the front face is not machined.

5. A locking nut according to claim 1 wherein the first axially directed surface is presented inwardly toward the axis.

6. A locking nut according to claim 5 wherein the gripping area of the second axially directed surface includes lands which impart a polygonal cross-sectional configuration to the body.

7. A nut according to claim 1 wherein the first and second grooves extend completely around the axis.

8. In combination with a shaft having an external thread, a nut engaged with the external thread and being capable of advancing over the shaft when rotated, said nut comprising: a body having a through bore extended along an axis and an internal thread extended along the surface of the bore, the thread being engaged with the external thread of the shaft, the body at one end having a back face which is machined to a prescribed angle with respect to the axis, the body at its opposite end having a front face which is also located at an angle to the axis, the body also having an external surface that is presented outwardly away from the axis, with the portion of the external surface that is closest to the front face serving as a gripping area for holding the body, the body further having an internal groove which opens into the bore, an external groove which opens out of the external surface, with the grooves dividing the body into a clamping section located between the back face and the external groove, a locking section located between the front face and the internal groove, and a web located between the two grooves, the thread being located in both the clamping section and the locking section and having its greater length in the clamping section, the web having the capacity to flex so as to enable the locking section to move axially toward the clamping section and disrupt the pitch in the internal thread; and screws which pass through the locking section and web and thread into the clamping section for driving the locking section toward the clamping section to disrupt the pitch of the internal thread and secure the nut against rotation relative to the shaft.

9. The combination according to claim 8 wherein the pitch of the thread does not vary across the internal groove before the screws drive the locking section toward the clamping section.

10. The combination according to claim 8 wherein the machine screws have heads which bear against the locking section.

11. The combination according to claim 8 wherein the gripping area of the external surface has lands which are arranged to impart a polygonal cross-sectional configuration to the body.

12. The combination according to claim 8 and further comprising a bearing having an inner race located around the shaft and provided with a raceway that is oblique to the axis and a back face beyond the large end of the raceway, an outer race having a raceway that is also oblique to the axis, and rolling elements located between the raceways of the two races; and wherein the back face of the nut is presented toward the back face of the inner race and establishes the axial position of the inner race on the shaft.

13. A nut according to claim 8 wherein the external and internal grooves extend completely around the axis.

14. A nut for engaging an external thread, said nut comprising: a body having a through bore extended along an axis and an internal thread extended along the surface of the bore, the body at one end having a back face which is machined to a prescribed angle with respect to the axis, the body at its opposite end having a front face which is also located at an angle to the axis, the body also having an external surface that is presented outwardly away from the axis, the body further having an internal groove which opens into the bore and an external groove which opens out of the external surface, with the grooves dividing the body into a clamping section located between the back face and the external groove, a locking section located between the front face and the internal groove, and a web located between the two grooves, the thread being located on both sides of the internal groove and having its greater length on the side occupied by the clamping section, the web having the capacity to flex so as to enable the locking section to move axially toward the clamping section and disrupt the pitch in the internal thread; screws which pass through the locking section and web and thread into the clamping section for driving the locking section toward the clamping section to disrupt the pitch of the internal thread and secure the nut, when it is engaged with an external thread, against rotation relative to that external thread.

15. The combination according to claim 14 wherein the internal thread, before the screws drive the locking section toward the clamping section, has essentially no variation in pitch across the internal groove.

16. The combination according to claim 15 wherein the machine screws have heads which bear against the locking section.

17. A nut according to claim 14 wherein the portion of the external surface that lies closest to the front face serves as a gripping area for firmly gripping the body to rotate the body.

18. The combination according to claim 17 wherein the gripping area of the external surface has lands which are arranged to impart a polygonal cross-sectional configuration to the body.

19. A nut according to claim 14 wherein the external and internal grooves extend completely around the axis.

* * * * *